Jan. 12, 1971 M. D. BONFELD ET AL 3,555,447
SIGNAL REFLECTOR AND CIRCULATOR NETWORKS FOR SYNCHRONIZING
AND COMBINING THE OUTPUTS OF A PLURALITY OF OSCILLATORS
Filed Dec. 18, 1968 2 Sheets-Sheet 1

INVENTORS M. D. BONFELD
L. F. MOOSE
BY [signature]
ATTORNEY

United States Patent Office 3,555,447

Patented Jan. 12, 1971

3,555,447

SIGNAL REFLECTOR AND CIRCULATOR NETWORKS FOR SYNCHRONIZING AND COMBINING THE OUTPUTS OF A PLURALITY OF OSCILLATORS

Murray D. Bonfeld, Allentown, and Louis F. Moose, Quakertown, Pa., assignors to Bell Telephone Laboratories, Incorporated, Murray Hill, N.J., a corporation of New York

Filed Dec. 18, 1968, Ser. No. 784,575

Int. Cl. H03b 3/06

U.S. Cl. 331—55 5 Claims

ABSTRACT OF THE DISCLOSURE

A locked oscillator system is composed of a plurality of unit oscillators connected together by means including particularly adjusted signal reflectors. In one configuration, each reflector combines a previously generated output signal and a unit oscillator signal to produce a new and a larger output signal and a synchronizing signal for the next unit oscillator. In another configuration one set of reflectors splits a master locking signal into a number of synchronizing signals and a second set of reflectors combines the unit oscillator signals into one output power signal. Both configurations provide means for applying identical synchronizing signals to each unit oscillator and for combining the signals from all unit oscillators into a single microwave power source.

BACKGROUND OF THE INVENTION

The present invention relates to locked oscillator arrangements, and more particularly to a means for combining the outputs from an arbitrary number of identical unit oscillators into a coherent, monochromatic, microwave power source. Solid-state devices such as transistors, Gunn-effect diodes and IMPATT diodes are more economical, reliable and long lived than vacuum tube microwave oscillators. The maximum power currently available from a single solid-state microwave oscillator, however, is limited to approximately one watt continuous. Therefore, for many applications combining means are essential to obtain higher power levels.

Prior art attempts to provide such combining means used the parallel and series approaches. The series method, however, is not desirable if many oscillators are joined, because the power applied to the latter oscillators becomes large enough to impair their performance. The parallel approach involves complex fan-out and combining networks and tends to produce bulky systems.

In the copending application of R. S. Engelbrecht, Ser. No. 783,056, filed Dec. 11, 1968 there is disclosed a novel means for locking an array of oscillators, using directional couplers and phase shifting means. The present application discloses alternative means for achieving a locked oscillator arrangement.

SUMMARY OF THE INVENTION

The present invention discloses new means, including power reflectors adjustable in amplitude and phase, for combining the outputs from several synchronized oscillators. This invention teaches that these reflectors, which act as substantially pure reactive impedance discontinuities reflecting a fraction of the incident power with a phase shift of 90 degrees, can be used in a new way, as signal combiners. Specifically, it teaches that two input signals of a given frequency may be combined at such a reflector to produce two output signals having any desired amplitude relationship. Thus, a previously generated output signal from preceding oscillators may be combined with a contribution from an individual oscillator at a reflector suitably adjusted to produce a new output signal and, if desired, a synchronizing signal for a succeeding oscillator. Appropriate adjustment of the reflector in amplitude and phase may be made, depending on the particular values of the input and output signals.

In one illustrative configuration, two parallel branches extend from the master oscillator to the output. In each branch alternate links contain unit oscillators and conductors; the links being connected at points comprising three-port circulators. The two branches are disposed so that each conductor link in a first branch is positioned opposite a unit oscillator in the corresponding link of the second branch. Lines connecting the two branches at the circulators between links have located on them reflectors particularly adjustable in phase and amplitude. By appropriate adjustment of these reflectors equal synchronizing signals may be applied to each unit oscillator, no matter how large the total generated signal has become. That portion of the generated signal not applied to a given unit oscillator in a first branch is directed instead to the corresponding conducting link of the opposite branch.

In another and improved configuration, the unit oscillators are connected in parallel with respect to each other but are fed in series with respect to the master oscillator and the signals are collected in series with respect to the output. The locking signal from the master oscillator enters a first branch and the output signal is derived from a second branch. Adjustable reflectors along the locking signal and output signal branches assure the application of equal synchronizing signals to each individual unit oscillator and the complete in phase combination of the unit oscillator output signals.

DETAILED DESCRIPTION

Figure 1:
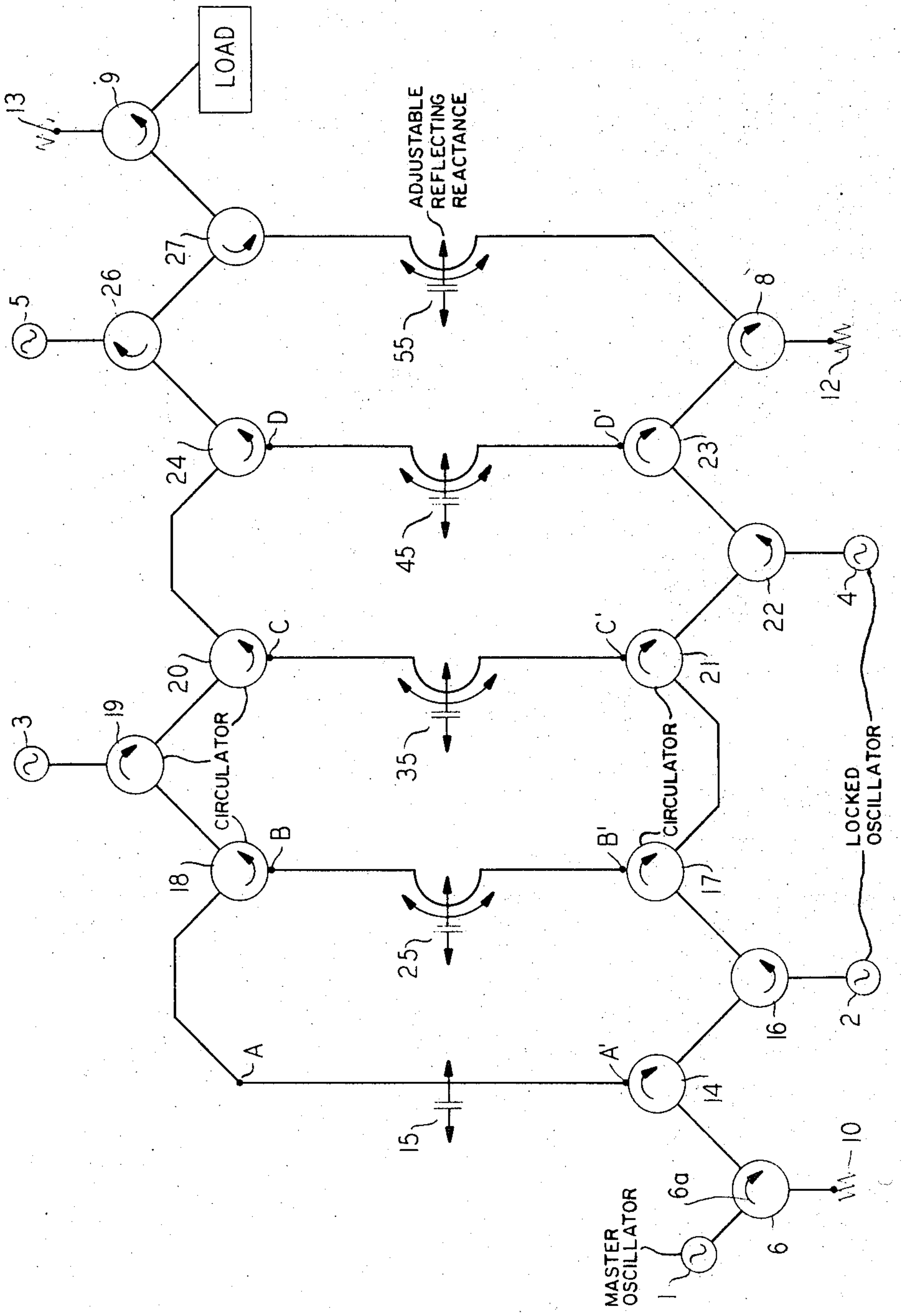
FIG. 1 is a schematic drawing of an illustrative circuit embodying the present invention.

Referring to FIG. 1, a circuit illustrative of one embodiment of the present invention is shown having a master oscillator 1 and four individual unit oscillators 2, 3, 4 and 5. Each of these five oscillators is designated as having an illustrative output of 400 milliwatts (mw.) and four milliwatts of power is to be applied as a synchronizing signal to each unit oscillator 2, 3, 4 and 5. The output signal from each individual oscillator is combined at an associated reflector with the previously generated output signal from preceding oscillators to produce a new and larger output and a synchronizing signal for a succeeding oscillator, if any, so that circulator 9 receives a power signal equal to the total output of all five oscillators.

Master oscillator 1 is connected to the circuit through one port of three-port microwave circulator 6 which provides sequential transmission of energy in the direction indicated by curved arrow *6a*. It is to be understood that each of the other circulators appearing in this and the other figures similarly provides sequential energy transmission in the direction indicated by the curved interior arrow.

The signal from master oscillator 1 applied to circulator 6 is transmitted to circulator 14 and issues from port A' toward first variable reflector 15. The reflectors are illustrated herein as a capacitor and a pair of crossed vectors indiacting adjustability in size and position. At locations where no phase adjustment is necessary, where one input signal exists, only size adjustment means are indicated. Specific structures providing suitable adjustable reactances are described in the copending applications of E. W. Aslaksen, Ser. No. 605,337, filed Dec. 28, 1966, now Pat. 3,477,028, granted Nov. 4, 1969 and of M. D. Bonfeld and E. G. Jaasma, Ser. No. 709,732, filed Mar. 1, 1968. Variable reflector 15 is adjusted to reflect a signal of 4 mw. to port A′ and to transmit the remaining 396 mw. of power to point A.

The 4 mw. signal applied to port A′ of circulator 14 is sent to circulator 16. It is then applied as a synchronizing signal to individual unit oscillator 2. The 404 mw. signal from unit oscillator 2 (comprising the 4 mw. locking signal and the 400 mw. unit oscillator output signal) is applied to circulator 17 and issues from port B′ toward variable reflector 25. Similarly, the 396 mw. main signal transmitted by reflector 15 to point A is applied to reflector 25 via port B of circulator 18. The operation of the adjustable reflectors, which is basic to the present invention, may be understood by reference to the specific case of reflector 25.

If a microwave signal of voltage X is directed from port B into reflector 25, a portion of that signal will be reflected back to port B with a 90 degree phase shift, and the remainder will be transmitted to port B′. The voltage reflection coefficient, $\rho$, is defined as the fraction of voltage reflected, so that the reflected voltage signal in the present illustration will have a magnitude of $\rho$X volts. Since $\rho$ is the fraction of voltage reflected and power is proportional to the square of voltage, $\rho^2$ is the fraction of power reflected. Furthermore, because the reflector is a nondissipative device, the fraction of power transmitted must be $1-\rho^2$. And finally, therefore, the fraction of voltage signal transmitted is $\sqrt{1-\rho^2}$.

That the sum of the magnitudes of the reflected and transmitted voltages $(\rho+\sqrt{1-\rho^2})$ may be larger than the magnitude of the original voltage is not surprising, for it is energy, not voltage, which must be conserved at the reflector. If the reflected voltage, for example, is 60 percent of the incident value, the reflected power is only 36 percent of the applied power, and the transmitted voltage must be 80 percent of the incident value to account for the remaining 64 percent of the applied power.

These relationships described in the two preceding paragraphs are known in the art, and the features of the present invention reside in their application to the problem of adjustable signal combination. When another signal having the same frequency is introducted to reflector 25 from port B′ it will split in the same proportions; that is, if it has a magnitude Y, $\rho$Y volts will be reflected back to port B′ with a −90 degree phase shift at reflector 25 and $\sqrt{1-\rho^2}$ Y volts will be passed to port B.

Interference will occur between the reflected component of each signal and the transmitted component of the other signal; its nature, constructive or destructive, will depend on the relative phase angle between the two components, which itself is a function of the lateral position of reflector 25 on its conductor. This position can be expressed in terms of a relative phase angle $\theta$ at reflector 25 between the original signals from ports B and B′. $\theta$ will be determined by the difference between the two path lengths from the respective sources of those signals to reflector 25 and since the signals have the same frequency, for a given position of reflector 25 $\theta$ will be constant over time.

The previously described input voltage signals from ports B and B′ at reflector 25 can be represented at an arbitrary time as vectors $V_{iB}$ and $V_{iB'}$ having respective magnitudes X and Y and a relative phase angle $\theta$:

$$V_{iB}=X\angle 0 \qquad (1)$$

$$V_{iB'}=Y\angle\theta \qquad (2)$$

Similarly, the output voltage signals to ports B and B′ composed of the transmitted and reflected components of the input signals, are vectorially written as follows:

$$V_{oB}=\rho V_{iB}\angle-90+\sqrt{1-\rho^2}V_{iB'} \qquad (3)$$

or $$V_{oB}=\rho X\angle\theta-90+Y\sqrt{1-\rho^2}\angle 0 \qquad (4)$$

$$V_{oB'}=\rho V_{iB'}\angle-90+\sqrt{1-\rho^2}V_{iB} \qquad (5)$$

or $$V_{oB'}=\rho Y\angle-90+X\sqrt{1-\rho^2}\angle\theta \qquad (6)$$

Equations 4 and 6 are not independent and therefore the known values of X, Y, $V_{oB}$, and $V_oB'$, do not lead to particular solutions for $\rho$ and $\theta$. Either equation produces instead a formula for one of the unkowns in terms of the other so that an infinite number of combinations of $\rho$ and $\theta$ exist which will meet the given conditions. In practice, other criteria provide a basis for choosing a particular combination of $\rho$ and $\theta$. Specifically, an arbitrary combination of $\rho$ and $\theta$ will produce a certain power split at the reflector at the normal operating frequency. While some variation in frequency will inevitably occur in practice, it is desirable to maintain a fixed value of the power split. Frequency change, though, alters the interference pattern and hence the power split of a given $\rho-\theta$ pair. Certain combinations of $\rho$ and $\theta$, located by trial and error methods, have a flatter frequency response curve than others, however, and for this reason they are the ones chosen from the spectrum of possibilities.

From the appearance of Equations 4 and 6 above, it is clear that the simplest calculation results when $\theta=\pm 90$ degrees, i.e., when the transmitted and reflected components are either exactly out-of-phase or exactly in-phase. If $\theta$ is arbitrarily made ±90 degrees, values of $\rho$ may be simply calculated for reflector 25 as well as for the other reflectors in the circuit of FIG. 1.

Specifically, reflector 25 receives 404 mw. of input power from port B′ and 396 mw. from port B. The desired output power at port B is 4 mw., and at port B′, 796 mw. In terms of Equation 4, with $\theta=-90$ degrees, $$V_{oB}=\rho_{25}V_{iB}-\sqrt{1-\rho_{25}^2}V_{iB'} \qquad (7)$$

From the given conditions, $$V_{oB}=2\text{ mv.} \qquad (8)$$

$$V_{iB}=\sqrt{396}\text{ mv.} \qquad (9)$$

$$V_{iB'}=\sqrt{404}\text{ mv.} \qquad (10)$$

Therefore $$2=\rho_{25}\sqrt{396}-\sqrt{404(1-\rho_{25}^2)} \qquad (11)$$

Equation 11 can be solved and the result is $$\rho_{25}=0.757 \qquad (12)$$

For further example, reflector 15 in FIG. 1 receives a 400 mw. input power signal from port A′ and no input from point A. The desired output power at port A′ is 4 mw., and at A, 396 mw. In magnitude terms equation (6) can be written with $\theta=-90$ degrees, as follows:

$$V_{oA'}=\rho_{15}V_{iA}+\sqrt{1-\rho_{15}^2}V_{iA} \qquad (13)$$

From the given power conditions, $$V_{oA'}=\sqrt{4}\text{ mv.}=2\text{ mv.} \qquad (14)$$

$$V_{iA'}=\sqrt{400}\text{ mv.}=20\text{ mv.} \qquad (15)$$

$$V_{iA}=0 \qquad (16)$$

Therefore $$2=20\rho_{15}+0 \qquad (17)$$

or $$\rho_{15}=0.1 \qquad (18)$$

Equation 4 could also have been used to solve for $\rho_{15}$. That equation, written in terms of opposite-signed magnitudes instead of out-of-phase vectors, is as follows:

$$V_{oA}=\rho_{25}\ V_{iA}-V_{iA}\cdot\sqrt{1-\rho_{15}^2} \quad (19)$$

$$\sqrt{396}=0-20\sqrt{1-\rho_{15}^2} \quad (20)$$

or $$\rho_{15}=0.1 \quad (21)$$

If a different value were chosen for $\theta$ the solutions to the above equations would be more complicated, but not basically different. Once a value of $\theta$ is pecified, $\rho$ would be determinable, and vice-versa.

Returning to the circuit of FIG. 1, reflector 25 is adjusted to send a desired 4 mw. signal to unit oscillator 3 via port B, circulator 18 and circulator 19. The remaining 796 mw. main signal (404 mw.+396 mw.−4 mw.) is reflected and applied via port B′, circulator 17, circulator 21, and port C′, to reflector 35. There it will be combined as described above with the 404 mw. signal from unit oscillator 3 applied from port C of circulator 20 to produce a new 4 mw. and a new 1196 mw. main signal.

This process may be repeated as often as desired until the necessary total power has been generated, or until circuit losses negate the power added by another stage. In practice, as stated above, the actual $\rho$—$\theta$ setting for each reflector is arrived at mechanically, by a trial-and-error investigation of the power split frequency response of various combinations. Each reflector in the arrangement of FIG. 1 will require an individual setting, since the power distribution at each will be different. However, the reflectors are adjusted sequentially, beginning with reflector 15, and no inter-relationship problems occur.

The final reflector, designated 55 in FIG. 1, is adjusted to completely cancel the voltage signals in the lower branch. Therefore, all the generated power is directed to output circulator 9 and then to the load. The total circuit power grows by 400 mw. per stage, so that the total power output from circulator 9 in the illustrative embodiment, ignoring circuit losses, is 2 watts.

Figure 2:
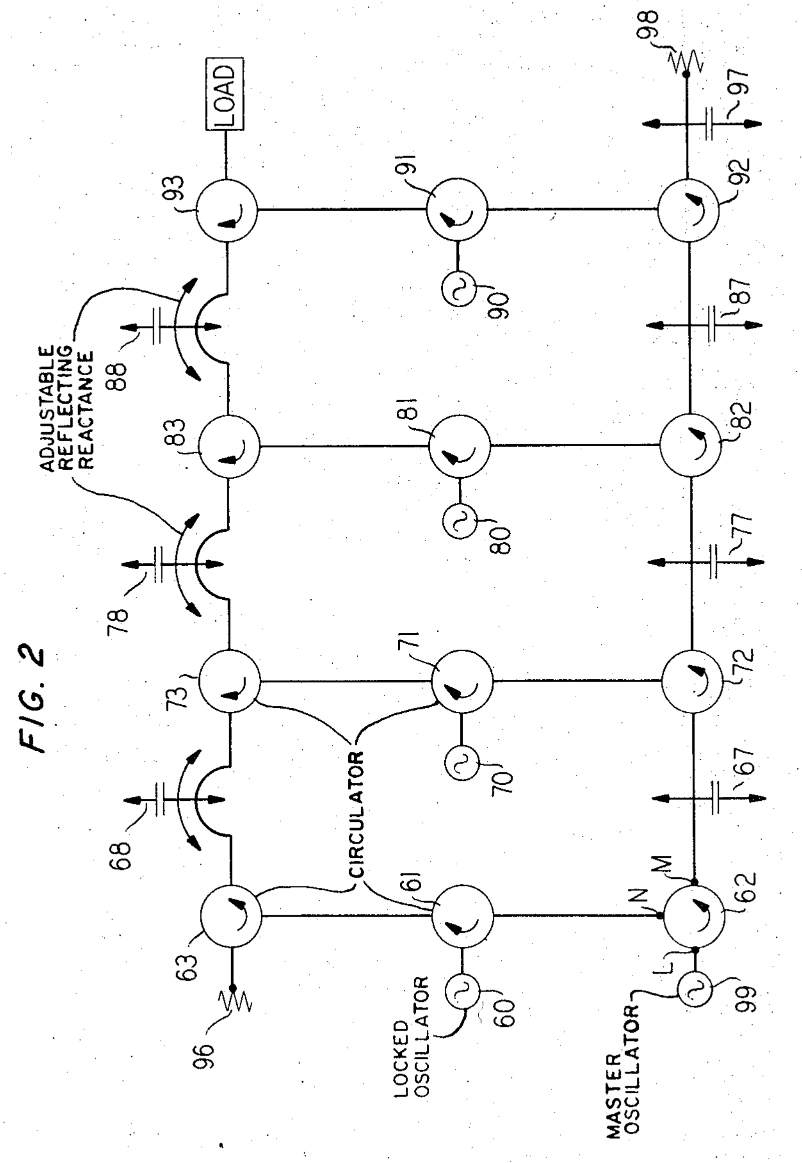
FIG. 2 is a schematic drawing of a further illustrative embodiment of the applicants' invention.

The circuit of FIG. 2 presents an alternative illustrative embodiment of the present invention in which the unit oscillators are connected in parallel with respect to each other and in series with respect to the locking and output signals. That is, the signal from master oscillator 99 in FIG. 3 is directed by circulators 62, 72, 82, and 92 toward dissipative termination 98. At each reflector 67, 77, 87, and 97, a portion of that signal is reflected back to the preceding circulator and then to an individual unit oscillator, where it serves as a synchronizing signal. Similarly, the output signals are combined at reflectors 68, 78, and 88 into a main signal directed toward the load. Circulators 63, 73, 83, and 93 are polarized to direct the individual output signals to the preceding reflector and the combined signals to the following reflector.

For example, if the illustrative signal values chosen for the circuit of FIG. 1 are again used, port L of circulator 62 receives a 400 mw. signal from master oscillator 99. All of this signal is sent from port M of circulator 62 to reflector 67 which is adjusted to transmit 396 mw. to circulator 72 and reflect 4 mw. back to port M of circulator 62. The reflected signal applied to port M appears at port N, then circulator 61, and finally unit oscillator 60. The 396 mw. signal transmitted by reflector 67 is similarly passed through circulator 72 to reflector 77 where the same operation is repeated. In the configuration shown, any unused power from master oscillator 99 is dissipated in termination 98.

The signals from the unit oscillators are combined in the output signal branch. 404 mw. signal from unit oscillator 60 arrives via circulators 61 and 63 at reflector 68. Circulator 73 sends the 404 mw. signal from unit oscillator 70 to the other side of reflector 68. Settings of $\rho_{68}$ and $\theta_{68}$ are then chosen as described above so that all 808 mw. of incident power are applied to circulator 73 and no power is sent backward. (The third port of circulator 63 is connected to termination 96 which effectively isolates master oscillator 99 from any inadvertently fed-back signals.) It will be remembered that the reflector, adjustable in both phase and amplitude as each is, has a capability for combining two input signals of a common frequency and any phase and amplitude relationship into two output signals of that frequency having any desired amplitude relationship. This process is repeated at each reflector, until the final unit oscillator output signal joins the main signal at reflector 88 and the full generated signal is fed out of circulator 93 to the load.

This embodiment overcomes a practical difficulty inherent in the circuit of FIG. 1. In practice a substantial phase shift occurs in each unit oscillator. That is, the phase of each unit oscillator output signal is not identical or even very close to the phase of the input locking signal. Conducting paths, however, introduce very little phase shift into the main signal. Therefore, in FIG. 1 at reflectors 25, 35, 45, and 55, a signal having a relatively small amount of phase shift must be combined with a signal having a relatively large amount. That is difficult to do in practice, and results in a narrow bandwidth for the arrangement.

The present embodiment avoids this problem by combining exclusively signals having similar amounts of phase shift. That is, only the low-phase shift locking signal is present at reflectors 67, 77, 87, and 97, and only large-phase shift output signals are combined at reflectors 68, 78, and 88. The signal paths from master oscillator 99 to the load each go through only one oscillator, and no portion of the unit oscillator output signals is combined with any portion of the master oscillator signal at any reflector.

In either illustrative configuration, the ultimate power available is limited by resistive losses in the various circuit components. If each of the repeated circuit stages for example has a 0.1 db (or 2.5 percent), passive loss associated with it, a tenth stage would add only 7.5 percent (10−2.5 percent) net power to the output, and the fortieth stage would add no power.

It should be understood that the particular circuit arrangements illustrated here are merely illustrative of the great number of configurations which could readily be devised by those skilled in the art using the above teachings. However, these would not depart from the spirit and scope of the present invention.

What is claimed is:

1. A high frequency power generation circuit comprising:

a plurality of individual oscillators connected in progression so that each intermediate oscillator generates a signal contribution to the output from preceding oscillators in response to a synchronizing signal received from a preceding oscillator, means associated with each of the intermediate oscillators for reflecting a portion of an applied high frequency signal and transmitting the remainder of the signal, means for applying the individual contribution of said intermediate oscillator to one side of the reflecting means and the ouput from preceding oscillators to the other side of the reflecting means, and means for adjusting the amplitude and position of the reflecting means so that the transmitted and reflected portions of the applied signals combine to produce an output to succeeding oscillators on one side of the reflecting means larger than the output from preceding oscillators and a synchronizing signal for a succeeding oscillator on the other side of the reflecting means.

2. A high frequency mixing circuit for receiving two input signals of the same frequency but of different amplitudes and for deriving therefrom a first output signal containing the major portion of the power in both input signals and a second output signal containing a minor portion of the power in both input signals, the circuit comprising:

two circulators having at least three arms and characterized by a successive circulation of power from an arm preceding to given arm to an arm succeeding the given arm, means for forming a common arm between said given arms of each of the circulators, means for applying the two input signals respectively to an arm of each of the circulators preceding the common arm, means in the common arm for splitting each of the two input signals into transmitted an dreflected components, means for adjusting the amplitude and position of the splitting means so that the transmitted and reflected components of each of the two input signals combine to produce the first and second output signals respectively in said given arms of each of the circulators, and means for conducting the first and second output signals respectively from an arm of each of the circulators succeeding the common arm.

3. A high frequeny power generation apparatus comprising:

a plurality of individual oscillators connected in progression so that each intermediate oscillator in the progression generates a signal contribution to the output from preceding oscillators in response to a synchronizing signal derived from the signal generated by at least one preceding oscillator, first means associated with each intermediate oscillator for deriving a synchronizing signal therefor from said signal generated by said preceding oscillator and for transmitting the remainder of said signal from said preceding oscillator to succeeding oscillators, and second means associated with each intermediate oscillator for combining the individual contribution of that oscillator with the output from preceding oscillators.

4. An apparatus as described in claim 3 wherein the first means includes reflectors particularly adjustable in amplitude and the second means includes reflectors particularly adjustable in phase and amplitude.

5. A high frequency power generation circuit including a plurality of individual oscillators connected in progression so that each intermediate oscillator in the progression generates a synchronized signal contribution to the total output wherein:

a signal derived from one oscillator is combined with a signal of different amplitude to produce first and second outputs of substantially different further amplitudes including means for applying the signals to opposite sides of a partial reflector so that each signal is split into transmitted and reflected components, means for adjusting the reflector in amplitude and position so that reflected and transmitted components on one side of said reflector combine substantially out of phase to produce a first output and transmitted and reflected components on the other side of said reflector combine substantially in phase to produce a second output many times greater than said first output, and means for applying said first output to one of said intermediate oscillators.

References Cited

UNITED STATES PATENTS

| | | | |
|---|---|---|---|
| 3,189,843 | 6/1965 | Bruck | 331—107(T) |
| 3,254,309 | 5/1966 | Miller | 331—107(T)X |
| 3,378,789 | 4/1968 | Gerlach | 331—56X |
| 3,414,840 | 12/1968 | DiDomenico, Jr., et al. | 331—94.5 |

ROY LAKE, Primary Examiner

S. H. GRIMM, Assistant Examiner

U.S. Cl. X.R.

331—56, 96, 107, 172; 333—11, 24.1